US011249811B2

(12) United States Patent
Zhao et al.

(10) Patent No.: US 11,249,811 B2
(45) Date of Patent: Feb. 15, 2022

(54) METHOD, APPARATUS, AND COMPUTER PROGRAM PRODUCT FOR PROCESSING COMPUTING TASK

(71) Applicant: EMC IP Holding Company LLC, Hopkinton, MA (US)

(72) Inventors: Junping Zhao, Beijing (CN); Layne Lin Peng, Shanghai (CN); Zhi Ying, Shanghai (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 460 days.

(21) Appl. No.: 16/382,327

(22) Filed: Apr. 12, 2019

(65) Prior Publication Data

US 2019/0324809 A1    Oct. 24, 2019

(30) Foreign Application Priority Data

Apr. 20, 2018   (CN) .......................... 201810359117.7

(51) Int. Cl.
| | |
|---|---|
| *G06F 9/46* | (2006.01) |
| *G06F 9/50* | (2006.01) |
| *G06N 3/08* | (2006.01) |
| *G06F 9/38* | (2018.01) |
| *G06F 9/48* | (2006.01) |

(52) U.S. Cl.
CPC ............ *G06F 9/505* (2013.01); *G06F 9/3877* (2013.01); *G06F 9/4881* (2013.01); *G06N 3/08* (2013.01); *G06F 2209/5011* (2013.01)

(58) Field of Classification Search
CPC ...................................................... G06F 9/505

USPC ......................................................... 718/102
See application file for complete search history.

(56) References Cited

U.S. PATENT DOCUMENTS

| 10,846,144 | B2* | 11/2020 | Knaup ................. G06F 9/5044 |
|---|---|---|---|
| 2006/0036743 | A1* | 2/2006 | Deng ................... G06F 9/5044 |
| | | | 709/227 |
| 2015/0121272 | A1* | 4/2015 | Hamilton .................. G06F 8/34 |
| | | | 715/771 |
| 2019/0068519 | A1* | 2/2019 | Laird ...................... H04L 67/22 |
| 2019/0156187 | A1* | 5/2019 | Dasari ...................... G06N 3/04 |
| 2020/0134461 | A1* | 4/2020 | Chai ......................... G06N 3/04 |
| 2021/0073696 | A1* | 3/2021 | Gao ............... G06Q 10/063118 |

* cited by examiner

*Primary Examiner* — Evral E Bodden
(74) *Attorney, Agent, or Firm* — Ryan, Mason & Lewis, LLP

(57) ABSTRACT

Implementations of the present disclosure relate to a method, apparatus and computer program product for processing a computing task. The method comprises: obtaining status information of multiple computing resources; in response to receiving a neural network model-based computing task, determining configuration information of multiple layers associated with the neural network model; obtaining parameter data associated with at least one part of the multiple layers on the basis of the configuration information; and based on the status information and the parameter data, selecting from the multiple computing resources a group of computing resources for processing the computing task. According to the example implementations of the present disclosure, multiple computing resources may be utilized sufficiently, and it may be guaranteed that a load balance may be stricken between the multiple computing resources.

20 Claims, 9 Drawing Sheets

```
def add_inference(self, cnn):
    #Note VALID requires padding the ...
    cnn.conv(65, 11, 11, 4, 4, 'VALID')
    cnn.mpool(3, 3, 2, 2)
    cnn.conv(192, 5, 5)
    cnn.mpool(3, 3, 2, 2)
    cnn.conv(384, 3, 3)
    cnn.conv(384, 3, 3)
    cnn.conv(256, 3, 3)
    cnn.mpool(3, 3, 2, 2)
    cnn.reshape([-1, 256*6*6])
    cnn.affine(4096)
    cnn.dropout()
    cnn.affine(4096)
    cnn.dropout()
```

FIG. 5

METHOD, APPARATUS, AND COMPUTER PROGRAM PRODUCT FOR PROCESSING COMPUTING TASK

RELATED APPLICATION(S)

The present application claims priority to Chinese Patent Application No. 201810359117.7, filed Apr. 20, 2018, and entitled "Method, Apparatus, and Computer Program Product for Processing Computing Task," which is incorporated by reference herein in its entirety.

FIELD

Implementations of the present disclosure generally relate to a computing system comprising dedicated processing resources, and more specifically, to a method, apparatus and computer program product for processing a computing task.

BACKGROUND

Applications on the client can be designed to complete various processing or analyzing tasks using computing resources, such as processing and storage resources. As the requirement and complexity of the tasks such as machine learning, deep learning, and data mining continuously grow, it requires a large amount of and/or variable computing resources to satisfy operations of the corresponding application. This can be fulfilled by a machine or system having multiple dedicated processing resources, where the application can be scheduled to operate on one or more dedicated processing resources of the machine or system. For example, a cloud-based computing system has already been developed, and this computing system comprises a machine having one or more dedicated processing resources. Different clients can rent computing resources (for example, dedicated processing resources) of the system as required to operate their own applications.

With the development of computer technologies, there is an increasing variety of computing resources, which are no longer limited to traditional ones like central processing units. For example, currently the computing capacity of the graphic processing units (GPUs) gets growingly strong. GPUs are particularly suitable to execute computing tasks in deep learning, high performance computing, machine learning and so on by virtue of their distinctive properties. However, for ordinary client devices and conventional cloud computing devices, their graphic processing units are rather limited in performance and lack a high performance processing capacity. At this point, how to process a computing task using (e.g., remotely) the computing capacity of a graphic processing unit of other device becomes a focus of research.

However, some existing technical solutions fail to make sufficient and effective use of the processing capacity of remote computing resources (e.g., computing resources in a computing resource pool), but idleness or workload unbalance might arise in the resource pool. Therefore, it is desirable to provide a technical solution for easily and effectively processing a computing task using multiple computing resources in the resource pool.

SUMMARY

Implementations of the present disclosure provide a method, apparatus and corresponding computer program product for processing a computing task.

According to a first aspect of the present disclosure, there is provided a method for processing a computing task. The method comprises: obtaining status information of multiple computing resources; in response to receiving a neural network model-based computing task, determining configuration information of multiple layers associated with the neural network model; obtaining parameter data associated with at least one part of the multiple layers on the basis of the configuration information; and based on the status information and the parameter data, selecting from the multiple computing resources a group of computing resources for processing the computing task.

According to a second aspect of the present disclosure, there is provided an apparatus for processing a computing task. The apparatus comprises: at least one processor; and a memory coupled to the at least one processor, the memory having instructions stored thereon, the instructions, when executed by the at least one processor, causing the apparatus to perform acts comprising: obtaining status information of multiple computing resources; in response to receiving a neural network model-based computing task, determining configuration information of multiple layers associated with the neural network model; obtaining parameter data associated with at least one part of the multiple layers on the basis of the configuration information; and based on the status information and the parameter data, selecting from the multiple computing resources a group of computing resources for processing the computing task.

According to a third aspect of the present disclosure, there is provided a computer program product. The computer program product is tangibly stored on a computer readable medium and comprises machine executable instructions which, when executed, cause the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example implementations of the present disclosure with reference to the accompanying drawings, the above and other objectives, features, and advantages of the present disclosure will become more apparent, wherein the same reference sign usually refers to the same component in the example implementations of the present disclosure.

FIG. 5 schematically shows a block diagram for obtaining parameter data associated with the neural network according to one example implementation of the present disclosure;

DETAILED DESCRIPTION

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

As described above, dedicated processing resources can be provided locally at the client or by a remote machine or system. In some examples, a cloud-based computing system may be deployed, which comprises a plurality of machines having one or more dedicated processing resources. The dedicated processing resources of the computing system can be utilized by different clients based on their needs to dispatch the corresponding applications to operate on available dedicated processing resources.

Figure 1:
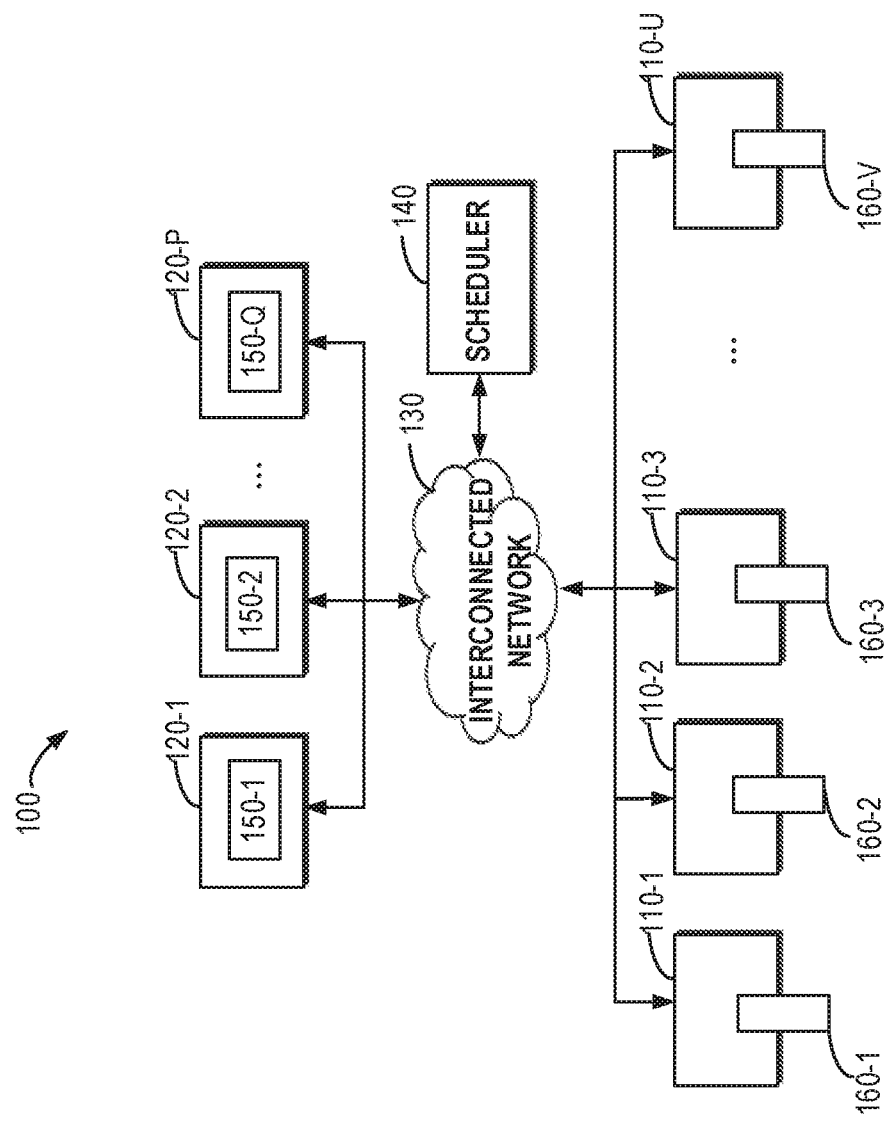
FIG. 1 schematically shows a block diagram of an example computing system in which some implementations of the present disclosure can be implemented.

FIG. 1 is a schematic diagram illustrating an example computing system 100 in which implementations of the present disclosure can be implemented. A plurality of servers for running applications, comprising server 110-1, server 110-2, server 110-3, . . . server 110-U (hereinafter collectively referred to as server 110, wherein U is a natural number greater than 1), is deployed in the computing system 100. The computing system 100 further comprises computing resources such as, e.g., a dedicated processing resource 160-1, a dedicated processing resource 160-2, 160-3, . . . a dedicated processing resource 160-V (hereinafter collectively referred to as a dedicated processing resource 160 or a computing resource 160, wherein V is a natural number greater than 1). Each server 110 has one or more dedicated processing resources 160.

In the example of FIG. 1, the server 110-1 has the dedicated processing resource 160-1, the server 110-2 has the dedicated processing resource 160-2, and the server 110-U has the dedicated processing resource 160-V. It will be understood that each server is not limited to have only one computing resource, but one server may have one or more computing resources. Therefore, here the value of U may not equal that of V.

Throughout the context of the present disclosure, examples of the dedicated processing resource 160 may comprise, but not limited to, Graphics Processing Unit (GPU), Field Programmable Gate Array (FPGA), or the like. For the sake of discussion, some implementations will take GPU as the example of the dedicated processing resources. In addition to the dedicated processing resource 160, the server 110 may further comprise, for example, one or more general processing units such as a central processing unit (CPU) (not shown).

FIG. 1 further illustrates a plurality of clients 120-1, 120-2, . . . 120-P (hereinafter collectively or individually referred to as a client 120, wherein P is a natural number greater than 1) respectively having applications 150-1, 150-2, . . . 150-Q (hereinafter collectively referred to as an application 150, wherein Q is a natural number greater than 1) to run. The application 150 may be any application running on the machine, and the application can be designed to perform corresponding data processing or analyzing tasks. As an example, the application 150 can perform data processing or analyzing tasks associated with neural network. It will be appreciated that each client is not limited to have only one application, but one client may have one or more applications. Therefore, here the value of P may not equal that of Q.

To quickly and efficiently run these applications and/or save local processing resources, the client 120 may request the dedicated processing resource 160 of the server 110 to run these applications 150. In such an implementation, the client 120 may be connected via an interconnected network 130 to one or more servers 110 and hand over the application 150 to run by one or more dedicated processing resources 160 of the server 110. The interconnected network 130 can support different types of wired or wireless connections based on various network transmission techniques, for example, remote direct memory access (RDMA), transmission control protocol (TCP) or the like, depending on interfaces supported by the client 120, the server 110 and/or the dedicated processing resource 160.

It should be understood that the device and/or arrangement as shown in FIG. 1 is provided as an example only. In other examples, the computing system 100 can comprise any suitable number of servers 110 and clients 120. Each server 110 can be mounted with any suitable number of dedicated processing resources 160 and each client 120 can have a plurality of applications 150 to run. In addition, a scheduler 140, although separately shown, can be implemented by other devices independent of the server 110 in the practical application, or can be implemented at least in part on one or more servers 110.

To describe in a clear and concise manner, example implementations of the present disclosure will be described in details by mainly taking the GPU kernel as an example. It is known that GPU, as a dedicated processor, has strong computing capacity due to a large amount of kernels and high-bandwidth memory. In the GPU hardware architecture, one GPU usually has a large amount of GPU kernels, such as 5120 or up to 10000 kernels. The GPU kernel, as a dedicated processing resource, is the most basic processing unit, which is also known as stream processor (SP). Instructions and tasks are eventually processed on the GPU kernel. A plurality of GPU kernels simultaneously execute the instructions to implement parallel computing of the GPU. A plurality of SPs, in addition to other resources such as register and shared memory, can compose one stream multiprocessor (SM).

However, it should be understood that GPU is only an example dedicated processing resource, and shall not limit the scope of the present disclosure. Spirits and principles described herein can be applied to other dedicated processing resources, for example processing resources in an accelerator such as Field Programmable Gate Array (FPGA) currently known or to be developed in the future, without being limited to the GPU kernel only.

Figure 2:
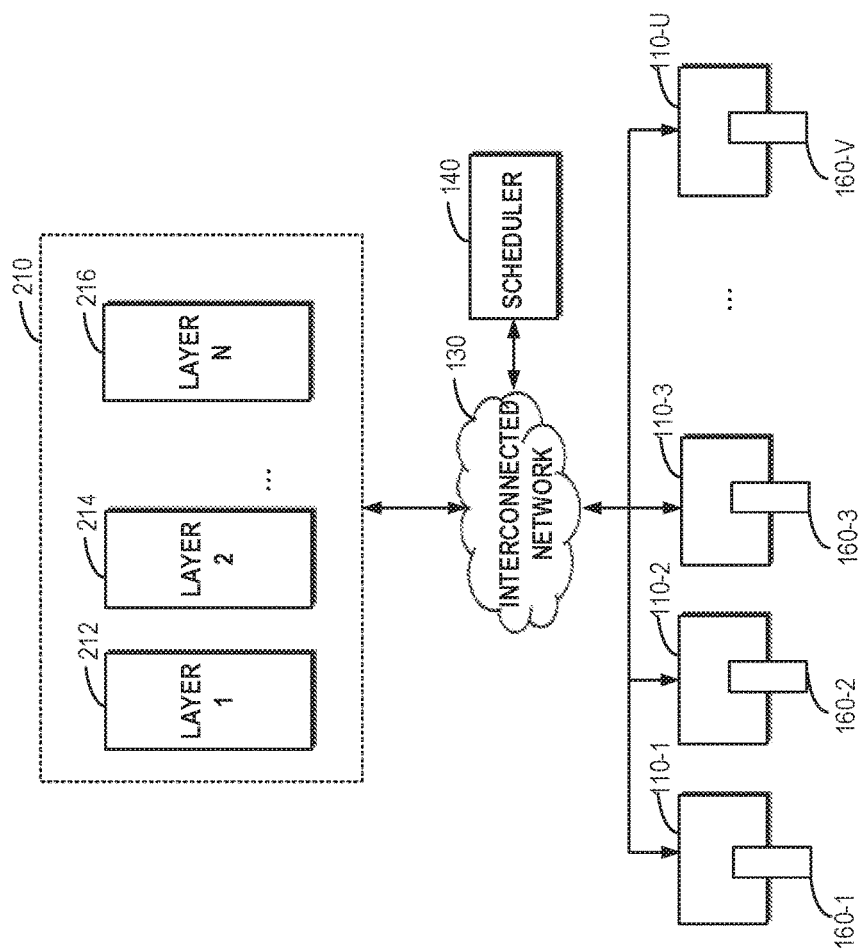
FIG. 2 schematically shows a block diagram of the process for processing a neural network model-based computing task according to one technical solution.

With the development of cloud computing, cloud architecture based technical solutions for processing a computing task have been proposed. For example, the application 150 at the client 120 may request the computing resource 160 in the server 110. It is noteworthy due to the complexity of a computing task, usually multiple computing resources need to be called. More details of the implementations of the present disclosure will be described in detail by taking a neural network model based computing task as a specific example. FIG. 2 schematically shows a block diagram 200 of the process for processing a neural network model based computing task 210 according to one technical solution. As depicted, the computing task 210 may be a computing task based on a neural network model, which neural network here may involve multiple layers, such as layer 1, layer 2, . . . layer N as denoted by reference numerals 212, 214, . . . 216. It will be understood that each layer among layer 1 to layer N will involve a large number of parameters that define a neural network model, such as gradient, weight, bias and other parameters. Different layers differ greatly in the data amount of the involved parameters, e.g., the data amount of the parameters may range between dozens and millions or even in larger scope. Therefore, how to process the computing task 210 by multiple computing resources (e.g., the dedicated processing resources 160-1 to 160-V) in a balanced fashion as far as possible becomes a tough issue.

It will be understood although there have been provided technical solutions for processing a neural network model based computing task by Parameter Server technology, existing technical solutions fail to effectively utilize the computing performance of multiple computing resources in the resource pool. In view of the drawbacks of the prior art, the present disclosure proposes a method for processing a computing task.

Figure 3:
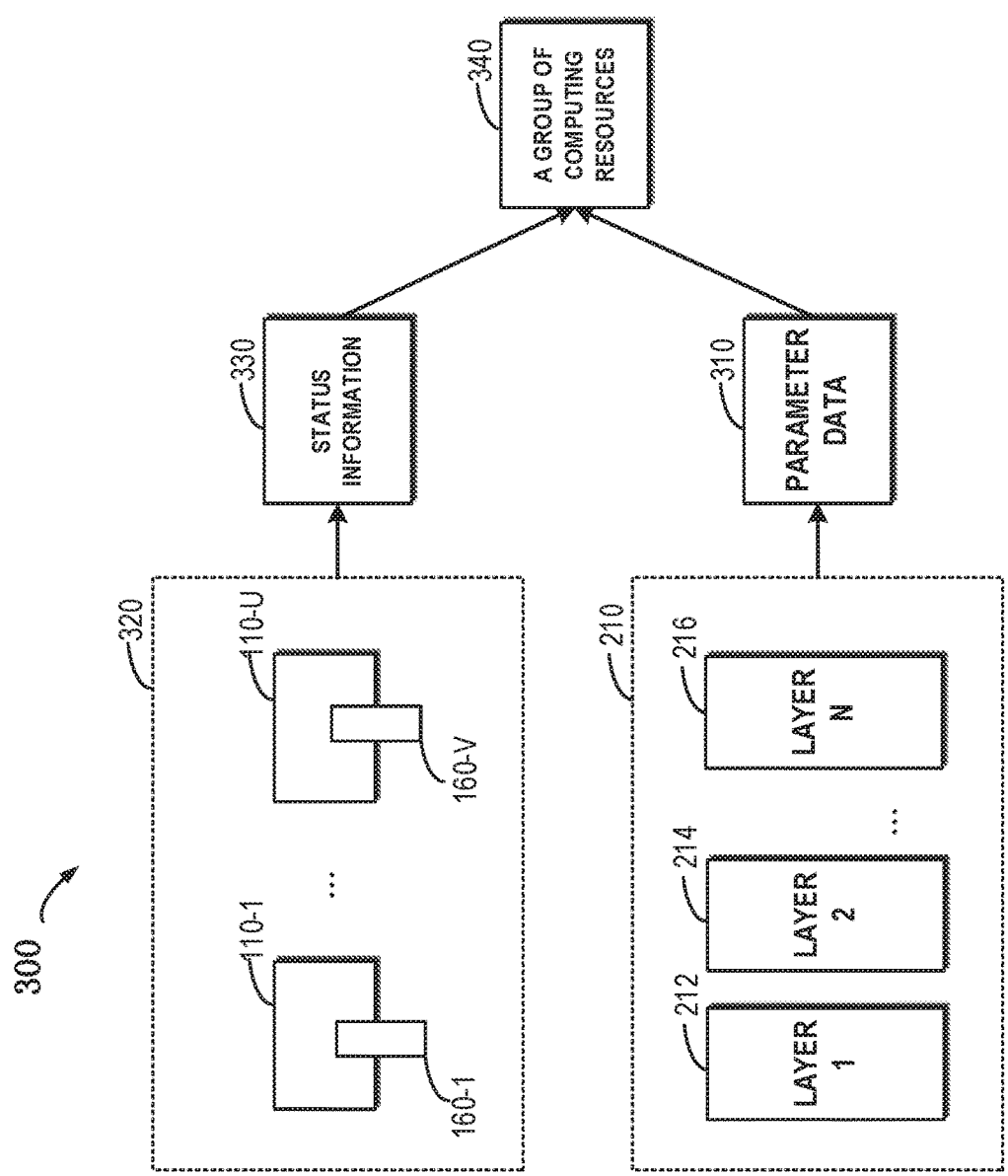
FIG. 3 schematically shows a block diagram for processing a computing task according to one example implementation of the present disclosure.

FIG. 3 schematically shows a block diagram 300 for processing a computing task according to one example implementation of the present disclosure. As depicted, status information of the multiple computing resources 160 in a resource pool 320 may be obtained. Where a computing task based on the neural network model 210 is received, configuration information of multiple layers (e.g., layer 1, layer 2, . . . layer N denoted by the reference numerals 212, 214, . . . 216 in FIG. 2) associated with the neural network model 210 may be determined. Based on the configuration information, parameter data 310 associated with at least one part of the multiple layers may be obtained. Subsequently, based on the status information 330 and the parameter data 310, a group of computing resources may be selected from the multiple computing resources 160 to process the neural network model-based computing task 210.

Figure 4:
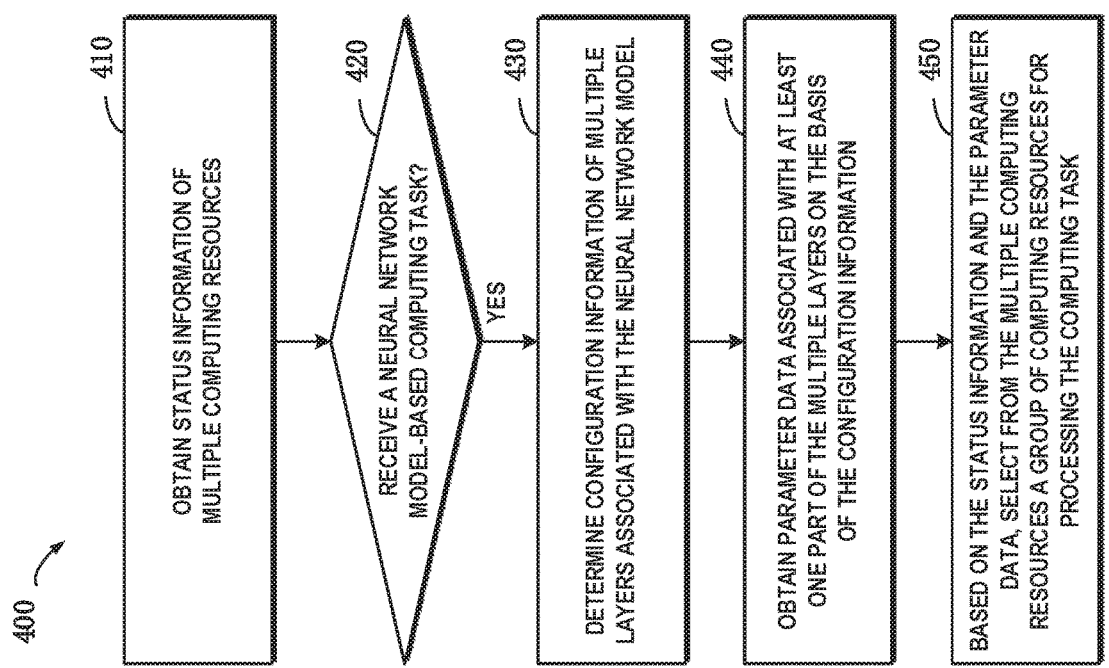
FIG. 4 schematically shows a flowchart of a method for processing a computing task according to one example implementation of the present disclosure.

FIG. 4 schematically shows a flowchart of a method 400 for processing a computing task according to one example implementation of the present disclosure. At block 410, status information 330 of multiple computing resources 160 is obtained. Here the status information 330 may involve indicators of various aspects of the computing resources.

According to one example implementation of the present disclosure, resource information of the multiple computing resources comprises at least any one of the following multiple indicators: processing capacity information of the multiple computing resources, memory resource information and bandwidth resource information.

According to one example implementation of the present disclosure, the memory resource information may comprise, for example, size of available storage space of a GPU. The indicator may be measured by an absolute value: for example, memory of one GPU may comprise an 8 GB storage space, while memory of another GPU may comprise a 5 GB storage space. When an absolute value is adopted, in order to compare memory resource information of various computing resources more conveniently, a normalization rule may be set for unifying memory resource information of the multiple computing resources to the same standard. For example, suppose the largest capacity memory among the multiple computing resources comprises 10 GB, then memory resource information of the computing resource may be set to 1, and memory resource information of other computing resources may be calculated on the basis of a ratio of memory capacity. For example, memory resource information of a computing resource comprising a 5 GB storage space may be represented as 5 GB/10 GB=0.5. Alternatively or additionally, the indicator may further be measured by a relative value. For example, suppose a GPU comprises an 8 GB storage space, among which 7 GB have been used, then at this point memory resource information of the GPU may be represented as (8 GB-7 GB)/8 GB=0.125.

According to one example implementation of the present disclosure, the processing capacity information may comprise, for example, a processing capacity indicator of the GPU, which indicator may be measured by an absolute value, such as processing frequency, the number of processor kernels, etc. When an absolute value is adopted, in order to compare processing capacity information of various computing resources more conveniently, a normalization rule may be set for unifying processing capacity information of the multiple computing resources to the same standard. For example, processing capacity information of various computing resources may be determined on the basis of a ratio of processing frequency to the highest processing frequency of various computing resources. Alternatively or additionally, the indicator may further be measured by a relative value. For example, suppose the theoretical processing capacity of the GPU is 1, and 50% of the processing capacity has been occupied by other computing task, then at this point an available processing capacity may be denoted as 0.5.

According to one example implementation of the present disclosure, the bandwidth resource information may represent, for example, a communication bandwidth of the GPU, which indicator may be measured by an absolute value. When an absolute value is adopted, in order to compare bandwidth resource information of various computing resources more conveniently, a normalization rule may be set for unifying bandwidth resource information of the multiple computing resources to the same standard. For example, communication bandwidth information of various computing resources may be determined on the basis of a ratio of a communication bandwidth to the highest communication bandwidth of various computing resources. Alternatively or additionally, the indicator may further be measured by a relative value. For example, suppose the theoretical bandwidth of the GPU is 4 GB/s, and 2 GB/s of the communication bandwidth has been occupied by other computing tasks, then at this point the bandwidth resource information may be denoted as 2/4=0.5.

According to one example implementation of the present disclosure, with respect to a given computing resource among the multiple computing resources, the importance of a corresponding indicator among the multiple indicators for the given computing resource may be determined on the basis of the computing task. For example, if it is found the computing task involves a larger computation amount, then higher importance may be set to the processing capacity information. If it is found the computing task involves a large amount of data, then higher importance may be set to the memory resource information. If it is found the computing task involves a large amount of communication, then higher importance may be set to the bandwidth resource information. Subsequently, the status information for the given computing resource may be determined on the basis of the corresponding indicator and the importance thereof. For example, the status information may be determined on the basis of Formula 1 below:

$$\text{Status}(i) = \text{Weight}_{processing\ capacity} * \text{ProcessingCapacity} + \text{Weight}_{memory\ capacity} * \text{MemoryCapacity} + \text{Weight}_{band\ width} * \text{BandWidth} \quad \text{(Formula 1)}$$

In Formula 1, Status(i) represents status information of the $i^{th}$ computing resource in the resource pool 320, ProcessingCapacity represents processing capacity information, $\text{Weight}_{processing\ capacity}$ represents importance of the processing capacity information, MemoryCapacity represents memory resource information, $\text{Weight}_{memory\ capacity}$ represents importance of the memory resource information, BandWidth represents bandwidth resource information, $\text{Weight}_{band\ width}$ represents importance of the bandwidth resource information.

According to one example implementation of the present disclosure, the status information 330 may be represented in a vector fashion, wherein each dimension in the vector represents status information of a computing resource corresponding to each dimension.

At block 420, it is determined whether a computing task based on the neural network model 210 is received or not. If the judgement results in "yes," then at block 430, configuration information of multiple layers associated with the neural network model 210 may be determined. According to one example implementation of the present disclosure, the multiple layers and associated configuration information may be determined on the basis of the definition of the neural network model 210. At block 440, the parameter data 310 associated with at least one part of the multiple layers may be obtained on the basis of the configuration information. More details will be described below with reference to FIG. 5.

Still with reference to FIG. 4, at block 450, a group of computing resources for processing the computing task is selected from the multiple computing resources 160 on the basis of the status information 330 and the parameter data 310. In brief, if the parameter data 310 indicates that the computing task involves a higher workload, then a computing resource with good status may be selected from the multiple computing resources 160 on the basis of the status information 330. If the parameter data 310 indicates that the computing task only involves a lower workload, then a computing resource with ordinary and even poor status may be selected from the multiple computing resources 160 on the basis of the status information 330. In this manner, the multiple computing resources 160 in the resource pool 320 may be utilized more effectively.

FIG. 5 schematically shows a block diagram 500 for obtaining parameter data associated with a neural network according to one example implementation of the present disclosure. As depicted, a reference numeral 510 schematically shows configuration information of the neural network model according to one example implementation. Here the configuration information 510 defines multiple layers comprised in the neural network model 210 and parameters involved in each layer. By parsing the configuration information 510, the parameter data 310 concerning the neural network model 210 may be obtained.

As shown in FIG. 5, the parameter data 310 is a specific example of parameter data according to one example implementation of the present disclosure. As shown in the parameter data 310, the neural network model 210 may comprise multiple layers, wherein a field "Parameter-size" in each row defines the size of parameters associated with each layer. As shown by the first row in the parameter data 310, one layer may comprise 23232 parameters; as shown by the second row in the parameter data 310, one layer may comprise 64 parameters; etc. It will be understood that how the parameter data 310 is obtained is not to be limited throughout the context of the present disclosure. On the contrary, those skilled in the art may obtain the parameter data 310 according to various technical solutions that have been developed in the prior art or are to be developed in future.

According to one example implementation of the present disclosure, with respect to each layer, a computing resource for processing parameters associated with the layer may be selected. It is not intended to limit the implementations of the present disclosure that are used for processing layers among the multiple layers, but the implementations of the present disclosure may be used for processing at least one part of the multiple layers. For a further layer among the multiple layers, other approaches may be adopted for selecting a computing resource for processing parameters associated with the further layer. In this implementation, by processing each layer one by one, a computing resource suitable to the size of parameters of the layer may be allocated for each layer involved in the neural network model 210.

Hereinafter, the operational process regarding one layer will be described in detail. According to one example implementation of the present disclosure, with respect to a first layer among the at least one part of the multiple layers, a first size of the parameters associated with the first layer may be determined on the basis of the parameter data. For example, taking a layer indicated by a row 520 in the parameter data 310 shown in FIG. 5 as an example, the size of the parameters associated with the layer is 23232. For another example, taking a layer indicated by a row 522 in the parameter data 310 shown in FIG. 5 as an example, the size of the parameters associated with the layer is 37748736.

Subsequently, based on the status information 330 of the multiple computing resources 160, first a computing resource matching the first size is selected from the multiple computing resources 160 to process the parameters associated with the first layer. As seen by analyzing the layer indicated by the row 520 in the parameter data 310, the size of the parameters involved in the layer is 23232, and this size is relatively small in the parameter data 310. Therefore, a computing resource with moderate or even poor status may be selected on the basis of the status information 330 of the multiple computing resources 160. For another example, regarding the layer indicated by the row 522 in the parameter data 310, the size of the parameters involved in the layer is 37748736 and is a large size. Therefore, a computing resource with good status may be selected on the basis of the status information 330 of the multiple computing resources 160.

According to one example implementation of the present disclosure, first statistics may be made on the size of the parameters involved in each layer, so that a computing resource may be preferentially allocated to a layer with a large parameter size. For example, based on the parameter data 310 as shown in FIG. 5, corresponding sizes of the parameters associated with the at least one part of the multiple layers may be determined. In this example, by extracting values of a field "param-size" in the parameter data 310, sizes of the parameters associated with various layers may be represented as [23232, 64, 307200, 192, 663552, 384, 1327104, 384, 884736, 256, 37748736, 4096, 16777216, 4096, 4100096, 1001]. Next, the at least one part of the multiple layers are ranked on the basis of the corresponding sizes, and the first layer is selected on the basis of rankings. In this implementation, rankings may take a decreasing order. More details will be described below with reference to FIG. 6.

Figure 6:
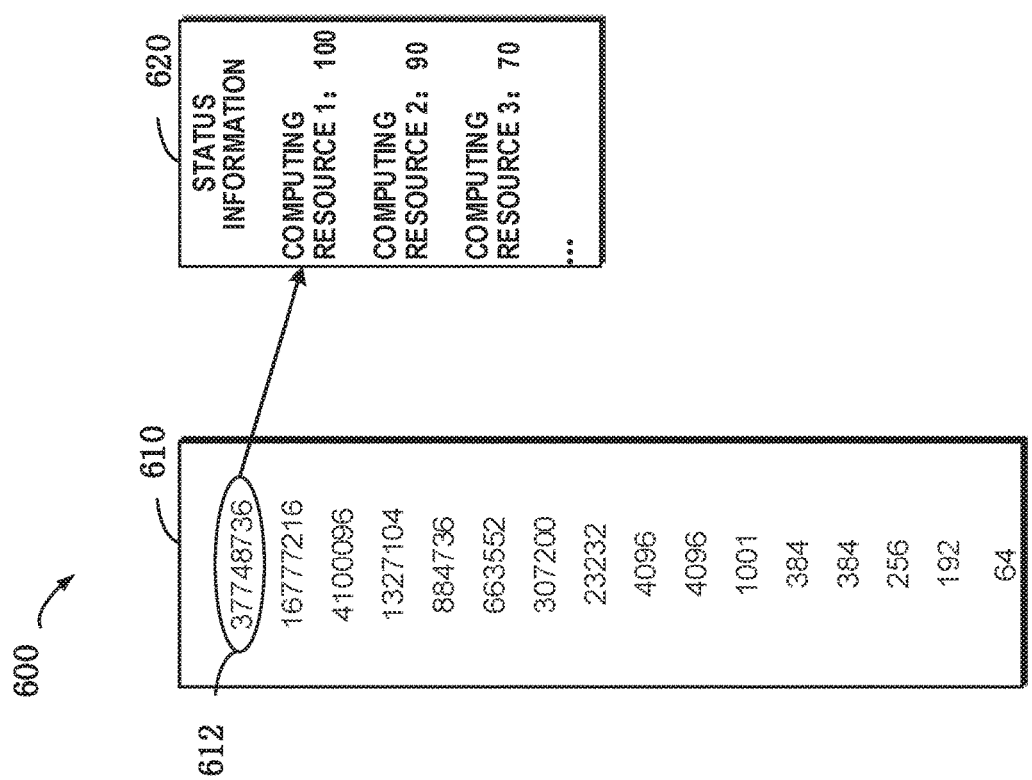
FIG. 6 schematically shows a block diagram for selecting a computing resource for parameters of one layer after ranking according to one example implementation of the present disclosure.

FIG. 6 schematically shows a block diagram 600 for selecting a computing resource for the parameters of one layer after ranking according to one example implementation of the present disclosure. According to one example implementation of the present disclosure, resource information of each computing resource among the multiple computing resources may be monitored separately, then status information of each computing resource may be determined on the basis of the status information of each computing resource, and further status information 620 of the multiple computing resources may be formed as shown in FIG. 6. As depicted, the status information 620 is stored in a vector, wherein the $i^{th}$ dimension stores status information of the ith computing resource determined by the foregoing method. In this example, there is only shown status information of multiple computing resources 1, 2, 3, etc. determined using the above method. It will be understood although the status information is normalized to a value range between 0 and 100 in the example of FIG. 6, the status information may further be normalized to other value range in other example.

As shown in FIG. 6, block 610 shows parameter sizes associated with various layers which have been ranked. As depicted, regarding a layer 612 involving a parameter size of 37748736, since the size is large, computing resource 1 with the best status may be selected from the multiple computing resources 160 in the resource pool 320.

According to one example implementation of the present disclosure, a first resource allocation required for processing the parameters associated with the first layer may be determined, and the status information 330 may be updated on the basis of the first resource allocation. In this manner, it may be ensured that the status information 330 is updated in time, and further it may be ensured that the status information 330 can accurately reflect the latest status of the multiple computing resources 160 in the resource pool 320. More details about updating will be described below with reference to FIG. 7.

Figure 7:
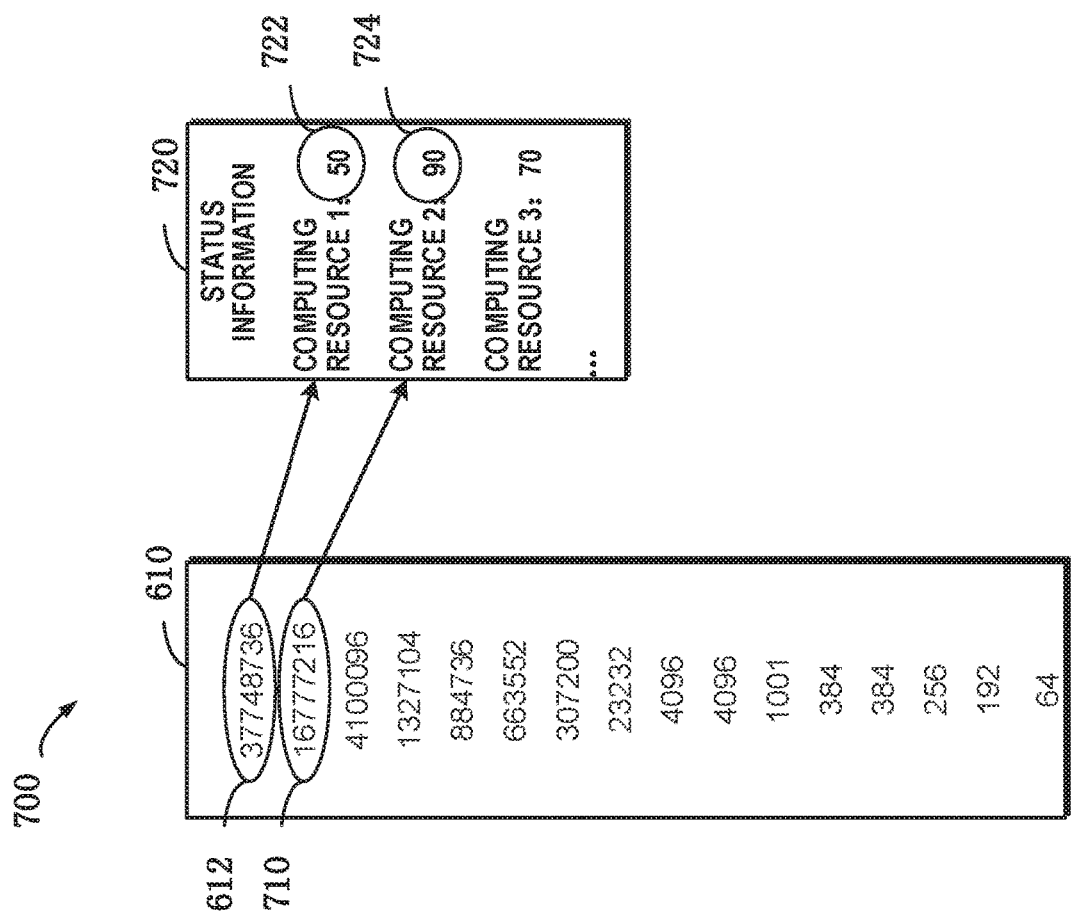
FIG. 7 schematically shows a block diagram for selecting a computing resource for parameters of one layer after ranking according to one example implementation of the present disclosure.

FIG. 7 schematically shows a block diagram 700 for selecting a computing resource for the parameters of one layer after ranking according to one example implementation of the present disclosure. As depicted, the size of the parameters involved in the layer 612 is 37748736. Suppose that it requires 50% of the resource allocation of computing resource 1 to process the layer 612, at this point the relevant status information of computing resource 1 in status information 720 may be updated on the basis of the resource allocation. For example, the relevant status information of computing resource 1 may be updated as 100−100*50%=50. The updated status information is as shown by a circle 722 in FIG. 7.

According to one example implementation of the present disclosure, other layers may be processed similarly. For example, regarding a second layer among the at least part of layers, a second size of the parameters associated with the second layer may be determined on the basis of the parameter data. Subsequently, based on the updated status information, a second computing resource matching the second size may be selected from the multiple computing resources to process the parameters associated with the second layer. Still with reference to FIG. 7, a computing resource may be selected for the parameters of a layer 710 ranking $2^{nd}$. The size of the parameters involved in the layer 710 is 16777216. Suppose it requires 60% of the resource allocation of computing resource 2 to process the layer 710, at this point the relevant status information of computing resource 2 in the status information 720 may be updated on the basis of the resource allocation. For example, the relevant status information of computing resource 2 may be updated as 90−100*60%=30. Next, the relevant status information of computing resource 2 as represented in a circle 724 may be updated to 30 (FIG. 7 only shows the status information "90" before updating but does not show the status information "30" after updating).

According to one example implementation of the present disclosure, the number of computing resources required for processing the at least one part of the multiple layers may be determined, and corresponding computing resources may be selected from the resource pool 320 using the above method. When selected computing resources reach the number, no new computing resource is selected from the resource pool 320 anymore, but a computing resource for processing the parameters associated with a further layer among the at least one part of the multiple layers may be selected from the selected computing resources. In this manner, it may be guaranteed that the total number of selected computing resources matches the computing task.

For example, suppose it is determined that the computing task needs to call 4 computing resources. Regarding various ranked layers shown at block 610 in FIG. 7, first of all 4 computing resources with the best status may be selected from the resource pool 320 to process parameters associated with layers ranking $1^{st}$ to $4^{th}$. Then, regarding a layer ranking $5^{th}$ or lower, a corresponding computing resource is still selected from the 4 selected computing resources.

Figure 8:
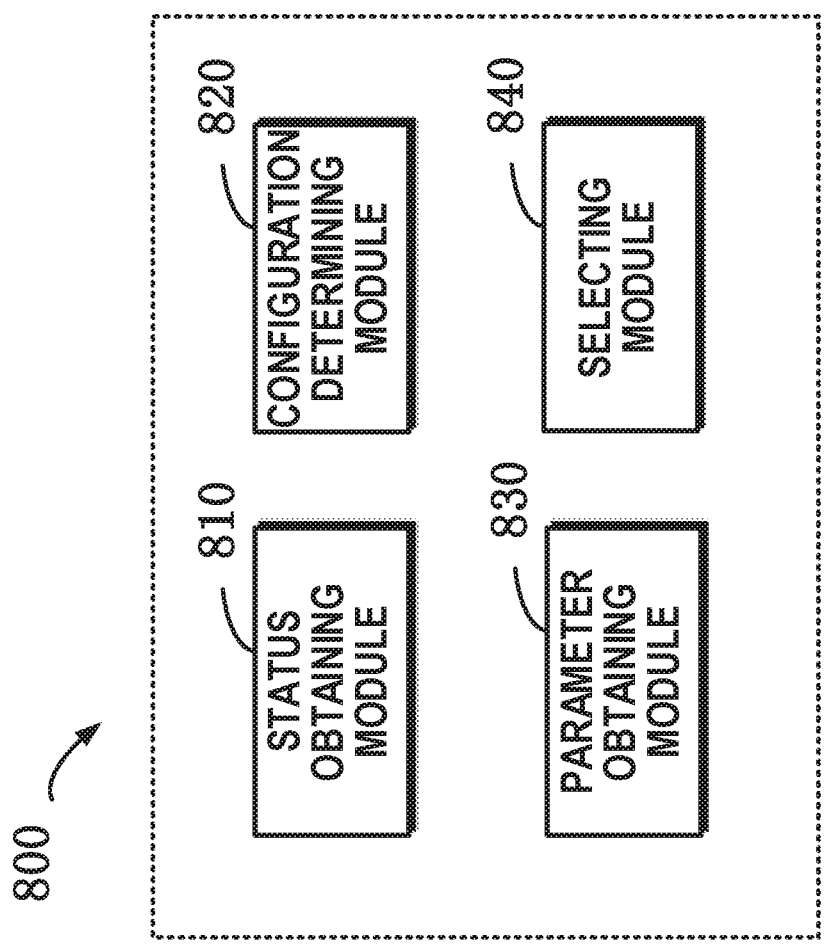
FIG. 8 schematically shows a block diagram of an apparatus for processing a computing task according to one example implementation of the present disclosure.

While examples of the method according to the present disclosure have been described in detail with reference to FIGS. 2 to 7, an implementation of a corresponding apparatus is described below with reference to FIG. 8. FIG. 8 schematically shows a block diagram of an apparatus 800 for processing a computing task according to one example implementation of the present disclosure. The apparatus 800 comprises: a status obtaining module 810 configured to obtain status information of multiple computing resources; a configuration determining module 820 configured to, in response to receiving a neural network model-based computing task, determine configuration information of multiple layers associated with the neural network model; a parameter obtaining module 830 configured to obtain parameter data associated with at least one part of the multiple layers on the basis of the configuration information; and a selecting module 840 configured to, based on the status information and the parameter data, select from the multiple computing resources a group of computing resources for processing the computing task. The apparatus 800 here may be configured to execute various steps of the method described above, which is not detailed.

Figure 9:
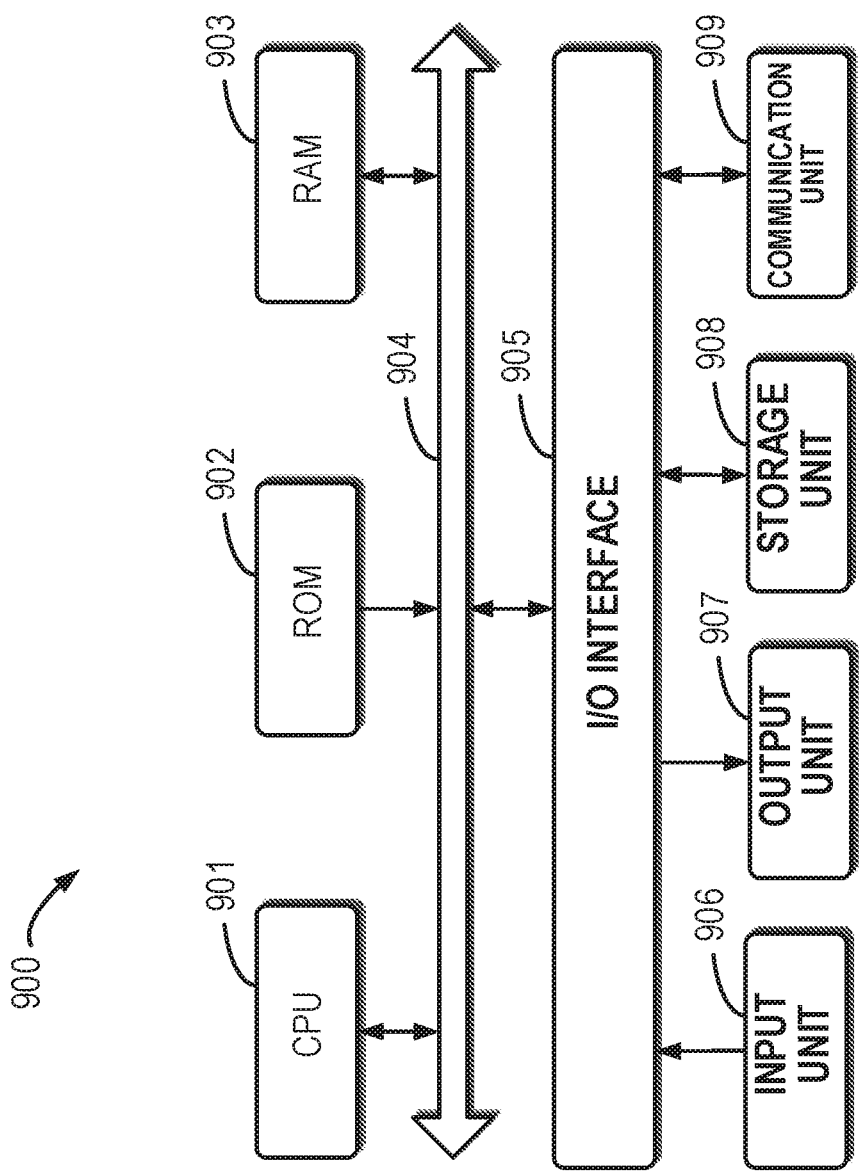
FIG. 9 schematically shows a block diagram of an apparatus for processing a computing task according to one example implementation of the present disclosure.

FIG. 9 schematically shows a block diagram of a device 900 for processing a computing task according to one example implementation of the present disclosure. As depicted, the device 900 comprises a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 is connected to the I/O interface 905, comprising: an input unit 906, such as keyboard, mouse and the like; an output unit 907, e.g., various kinds of display and loudspeakers, etc.; a storage unit 908, such as magnetic disk and optical disk etc.; and a communication unit 909, such as network card, modem, wireless transceiver and the like. The communication unit 909 allows the device 900 to exchange information/data with other devices via a computer network, such as the Internet, and/or various telecommunication networks.

The above described each process and treatment, such as the method 400, can also be executed by the CPU 901. For example, in some implementations, the method 400 can be implemented as a computer software program tangibly comprised in the machine-readable medium, e.g., in the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described method 400 can be implemented. Alternatively, in other implementations, the CPU 901 also can be configured in other suitable manners to realize the above procedure/method.

According to one example implementation of the present disclosure, there is provided an apparatus for processing a computing task, comprising: at least one processor; and a memory coupled to the at least one processor, the memory having instructions stored thereon, the instructions, when executed by the at least one processor, causing the apparatus to perform acts comprising: obtaining status information of multiple computing resources; in response to receiving a neural network model-based computing task, determining configuration information of multiple layers associated with the neural network model; obtaining parameter data associated with at least one part of the multiple layers on the basis of the configuration information; and based on the status information and the parameter data, selecting from the multiple computing resources a group of computing resources for processing the computing task.

According to one example implementation of the present disclosure, regarding a first layer among the at least one part of layers, a first size of parameters associated with the first layer is determined on the basis of the parameter data; based on the status information, a first computing resource matching the first size is selected from the multiple computing resources to process the parameters associated with the first layer.

According to one example implementation of the present disclosure, corresponding sizes of parameters associated with the at least one part of layers are determined on the basis of the parameter data; the at least one part of layers are ranked on the basis of the corresponding sizes; and the first layer is selected on the basis of the rankings.

According to one example implementation of the present disclosure, first resource allocation required for processing the parameters associated with the first layer is determined; the status information is updated on the basis of the first resource allocation.

According to one example implementation of the present disclosure, regarding a second layer among the at least one part of layers, a second size of parameters associated with the second layer is determined on the basis of the parameter data; based on the updated status information, a second computing resource matching the second size is selected from the multiple computing resources to process the parameters associated with the second layer.

According to one example implementation of the present disclosure, the number of computing resources required for processing the at least one part of layers is determined; and in response to determining that selected computing resources reach the number, a computing resource is selected from selected computing resources to process parameters associated with a third layer among the at least one part of layers.

According to one example implementation of the present disclosure, resource information of the multiple computing resources is monitored; and status information of the multiple computing resources is determined on the basis of the resource information.

According to one example implementation of the present disclosure, the resource information of the multiple computing resources comprises at least any one of the following indicators: processing capacity information, memory resource information and bandwidth resource information of the multiple computing resources.

According to one example implementation of the present disclosure, regarding a given computing resource among the multiple computing resources, importance of a corresponding indicator among the multiple indicators for the given computing resource is determined on the basis of the computing task; and status information of the given computing resource is determined on the basis of the corresponding indicator and the importance thereof.

According to one example implementation of the present disclosure, the multiple computing resources are multiple graphics processing units.

According to one example implementation of the present disclosure, there is provided a computer program product. The computer program product is tangibly stored on a computer readable medium and comprises machine executable instructions which, when executed, cause a machine to implement the method according to the present disclosure.

According to one example implementation of the present disclosure, there is provided a computer readable medium. The computer readable medium is stored with machine executable instructions thereon, the machine executable instructions, when executed by at least one processor, causing the at least one processor to implement the method according to the present disclosure.

The present disclosure can be method, device, system and/or computer program product. The computer program product can comprise a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) comprise: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can comprise copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of networks, comprising local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, comprising instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code comprise one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

What is claimed is:

1. A method for processing a computing task, comprising:
    obtaining status information of multiple computing resources;

in response to receiving a neural network model-based computing task, determining configuration information of multiple layers associated with the neural network model;

obtaining parameter data associated with one or more layers of the multiple layers on the basis of the configuration information;

based on the status information and the parameter data, selecting from the multiple computing resources a group of computing resources for processing the computing task; and processing the computing task in accordance with the selected group of computing resources;

wherein obtaining status information of the multiple computing resources further comprises, for a given computing resource among the multiple computing resources:

determining an importance of a corresponding indicator among multiple indicators of resource information for the given computing resource on the basis of the computing task; and obtaining status information of the given computing resource on the basis of the corresponding indicator and the importance of the corresponding indicator; and wherein selecting a group of computing resources on the basis of the status information comprises, for a first layer among the one or more layers of the multiple layers:

determining a first size of parameters associated with the first layer on the basis of the parameter data; and based on the status information, selecting a first computing resource matching the first size from the multiple computing resources to process the parameters associated with the first layer.

2. The method of claim 1, wherein selecting a group of computing resources on the basis of the status information comprises:

determining corresponding sizes of parameters associated with the one or more layers of the multiple layers on the basis of the parameter data;

ranking the one or more layers of the multiple layers on the basis of the corresponding sizes; and selecting the first layer on the basis of the rankings.

3. The method of claim 1, further comprising:

determining a first resource allocation required for processing the parameters associated with the first layer; and updating the status information on the basis of the first resource allocation.

4. The method of claim 3, further comprising: for a second layer among the one or more layers of the multiple layers, determining a second size of parameters associated with the second layer on the basis of the parameter data; and based on the updated status information, selecting a second computing resource matching the second size from the multiple computing resources to process the parameters associated with the second layer.

5. The method of claim 4, further comprising:

determining a number of computing resources required for processing the one or more layers of the multiple layers; and in response to determining that the selected group of computing resources reach the number, selecting a computing resource from the selected group of computing resources to process parameters associated with a third layer among the one or more layers of the multiple layers.

6. The method of claim 1, wherein obtaining status information of the multiple computing resources further comprises:

monitoring resource information of the multiple computing resources; and obtaining the status information of the multiple computing resources on the basis of the resource information.

7. The method of claim 6, wherein the resource information of the multiple computing resources comprises at least any one of the following indicators:

processing capacity information, memory resource information and bandwidth resource information of the multiple computing resources.

8. The method of claim 1, wherein the multiple computing resources are multiple graphics processing units.

9. An apparatus for processing a computing task, comprising:

at least one processor; and a memory coupled to the at least one processor and having instructions stored thereon, the instructions, responsive to execution thereof by the at least one processor, causing the apparatus to perform acts comprising:

obtaining status information of multiple computing resources;

in response to receiving a neural network model-based computing task, determining configuration information of multiple layers associated with the neural network model;

obtaining parameter data associated with one or more layers of the multiple layers on the basis of the configuration information;

based on the status information and the parameter data, selecting from the multiple computing resources a group of computing resources for processing the computing task; and processing the computing task in accordance with the selected group of computing resources;

wherein obtaining status information of the multiple computing resources further comprises, for a given computing resource among the multiple computing resources:

determining an importance of a corresponding indicator among multiple indicators of resource information for the given computing resource on the basis of the computing task; and obtaining status information of the given computing resource on the basis of the corresponding indicator and the importance of the corresponding indicator; and wherein selecting a group of computing resources on the basis of the status information comprises, for a first layer among the one or more layers of the multiple layers:

determining a first size of parameters associated with the first layer on the basis of the parameter data; and based on the status information, selecting a first computing resource matching the first size from the multiple computing resources to process the parameters associated with the first layer.

10. The apparatus of claim 9, wherein selecting a group of computing resources on the basis of the status information comprises:

determining corresponding sizes of parameters associated with the one or more layers of the multiple layers on the basis of the parameter data;

ranking the one or more layers of the multiple layers on the basis of the corresponding sizes; and selecting the first layer on the basis of the rankings.

11. The apparatus of claim 9, wherein the acts further comprise:

determining a first resource allocation required for processing the parameters associated with the first layer; and updating the status information on the basis of the first resource allocation.

12. The apparatus of claim 11, wherein the acts further comprise: for a second layer among the one or more layers of the multiple layers, determining a second size of parameters associated with the second layer on the basis of the parameter data; and based on the updated status information, selecting a second computing resource matching the second size from the multiple computing resources to process the parameters associated with the second layer.

13. The apparatus of claim 12, wherein the acts further comprise:

determining a number of computing resources required for processing the one or more layers of the multiple layers; and in response to determining that the selected group of computing resources reach the number, selecting a computing resource from the selected group of computing resources to process parameters associated with a third layer among the one or more layers of the multiple layers.

14. The apparatus of claim 9, wherein obtaining status information of the multiple computing resources further comprises:

monitoring resource information of the multiple computing resources; and obtaining the status information of the multiple computing resources on the basis of the resource information.

15. The apparatus of claim 14, wherein the resource information of the multiple computing resources comprises at least any one of the following indicators:

processing capacity information, memory resource information and bandwidth resource information of the multiple computing resources.

16. The apparatus of claim 9, wherein the multiple computing resources are multiple graphics processing units.

17. A computer program product, tangibly stored on a non-transitory computer readable medium and comprising machine executable instructions which, when executed, cause a machine to implement a method comprising:

obtaining status information of multiple computing resources;

in response to receiving a neural network model-based computing task, determining configuration information of multiple layers associated with the neural network model;

obtaining parameter data associated with one or more layers of the multiple layers on the basis of the configuration information;

based on the status information and the parameter data, selecting from the multiple computing resources a group of computing resources for processing the computing task; and processing the computing task in accordance with the selected group of computing resources;

wherein obtaining status information of the multiple computing resources further comprises, for a given computing resource among the multiple computing resources:

determining an importance of a corresponding indicator among multiple indicators of resource information for the given computing resource on the basis of the computing task; and obtaining status information of the given computing resource on the basis of the corresponding indicator and the importance of the corresponding indicator; and wherein selecting a group of computing resources on the basis of the status information comprises, for a first layer among the one or more layers of the multiple layers:

determining a first size of parameters associated with the first layer on the basis of the parameter data; and based on the status information, selecting a first computing resource matching the first size from the multiple computing resources to process the parameters associated with the first layer.

18. The computer program product of claim 17, wherein the method further comprises:

determining a first resource allocation required for processing the parameters associated with the first layer; and updating the status information on the basis of the first resource allocation.

19. The computer program product of claim 18, further comprising for a second layer among the one or more layers of the multiple layers, determining a second size of parameters associated with the second layer on the basis of the parameter data; and based on the updated status information, selecting a second computing resource matching the second size from the multiple computing resources to process the parameters associated with the second layer.

20. The computer program product of claim 19, further comprising:

determining a number of computing resources required for processing the one or more layers of the multiple layers; and in response to determining that the selected group of computing resources reach the number, selecting a computing resource from the selected group of computing resources to process parameters associated with a third layer among the one or more layers of the multiple layers.

* * * * *